United States Patent
Ruedisser et al.

(10) Patent No.: US 12,499,751 B2
(45) Date of Patent: *Dec. 16, 2025

(54) DEVICE FOR RECEIVING SIGNALS VIA AT LEAST ONE ELECTRICALLY DRIVEABLE OR ADJUSTABLE FURNITURE ELEMENT

(71) Applicant: Julius Blum GmbH, Hoechst (AT)

(72) Inventors: Thomas Ruedisser, Hohenems (AT); Florian Burtscher, Dornbirn (AT); Thomas Taimler, Hoechst (AT)

(73) Assignee: Julius Blum GmbH, Hoechst (AT)

( * ) Notice: Subject to any disclaimer, the term of this patent is extended or adjusted under 35 U.S.C. 154(b) by 429 days.

This patent is subject to a terminal disclaimer.

(21) Appl. No.: 18/073,260

(22) Filed: Dec. 1, 2022

(65) Prior Publication Data
US 2023/0103435 A1 Apr. 6, 2023

Related U.S. Application Data

(63) Continuation of application No. PCT/AT2021/060193, filed on Jun. 2, 2021.

(30) Foreign Application Priority Data

Jun. 5, 2020 (AT) .............. A 50488/2020

(51) Int. Cl.
*G08C 17/02* (2006.01)
*A47B 88/457* (2017.01)
(Continued)

(52) U.S. Cl.
CPC .......... *G08C 17/02* (2013.01); *A47B 88/457* (2017.01); *A47L 9/009* (2013.01); *A47L 9/2894* (2013.01);
(Continued)

(58) Field of Classification Search
CPC .......... G08C 17/02; E05F 15/60; E05F 15/77; A47B 88/457; H05B 1/0263; A47L 2201/04
(Continued)

(56) References Cited

U.S. PATENT DOCUMENTS 7,068,208 B2 6/2006 Wu
9,478,122 B2 10/2016 Hille
(Continued)

FOREIGN PATENT DOCUMENTS

AT 11 904 7/2011
AT 513756 7/2014
(Continued)

OTHER PUBLICATIONS

International Search Report issued Sep. 2, 2021 in International (PCT) Application No. PCT/AT2021/060193.
(Continued)

*Primary Examiner* — Md Azad
(74) *Attorney, Agent, or Firm* — Wenderoth, Lind & Ponack, L.L.P.

(57) ABSTRACT

A device for receiving signals via an electrically driveable or adjustable furniture element includes a receiving device for receiving at least one wirelessly transmitted signal, and the at least one wirelessly transmitted signal that has been received by the receiving device can be transmitted on to a furniture element. The receiving device is designed such that the at least one wirelessly transmitted signal can be received and processed via a first transmission protocol and a second transmission protocol, wherein the first transmission protocol is different from the second transmission protocol.

29 Claims, 7 Drawing Sheets

(51) Int. Cl.
*A47L 9/00* (2006.01)
*A47L 9/28* (2006.01)
*E05F 15/60* (2015.01)
*E05F 15/77* (2015.01)
*H05B 1/02* (2006.01)

(52) U.S. Cl.
CPC .............. *E05F 15/60* (2015.01); *E05F 15/77* (2015.01); *H05B 1/0263* (2013.01); *A47L 2201/04* (2013.01)

(58) Field of Classification Search
USPC ........................................................ 700/275
See application file for complete search history.

(56) References Cited

U.S. PATENT DOCUMENTS

| | | | |
|---|---|---|---|
| 10,051,599 | B2 | 8/2018 | Lowe et al. |
| 10,448,357 | B2 | 10/2019 | Lowe et al. |
| 10,590,692 | B2 | 3/2020 | Bohle |
| 10,736,075 | B2 | 8/2020 | Lowe et al. |
| 10,893,502 | B2 | 1/2021 | Lowe et al. |
| 11,438,867 | B2 | 9/2022 | Lowe et al. |
| 2004/0252045 | A1 | 12/2004 | Wu |
| 2009/0099706 | A1 | 4/2009 | Wenzel et al. |
| 2013/0063053 | A1 | 3/2013 | Scheffknecht |
| 2014/0031992 | A1* | 1/2014 | Bergman ................ F24F 11/30 700/276 |
| 2014/0184123 | A1 | 7/2014 | Wenzel |
| 2015/0130595 | A1* | 5/2015 | Hille ...................... G08C 23/04 340/12.5 |
| 2016/0242542 | A1 | 8/2016 | Friesenecker et al. |
| 2017/0208565 | A1 | 7/2017 | Lowe et al. |
| 2018/0289175 | A1 | 10/2018 | Lukas |
| 2018/0291650 | A1 | 10/2018 | Zabala Zabaleta et al. |
| 2018/0324745 | A1 | 11/2018 | Lowe et al. |
| 2019/0010747 | A1* | 1/2019 | Bohle ..................... E05F 1/1058 |
| 2019/0313808 | A1* | 10/2019 | Hille ..................... A47C 20/041 |
| 2020/0145957 | A1 | 5/2020 | Lowe et al. |
| 2020/0344716 | A1 | 10/2020 | Lowe et al. |
| 2021/0035580 | A1* | 2/2021 | Hille ..................... A47C 20/041 |
| 2021/0106138 | A1* | 4/2021 | Gehrke ................. G08C 17/02 |
| 2021/0235411 | A1 | 7/2021 | Lowe et al. |
| 2021/0364227 | A1* | 11/2021 | Kim ..................... G05B 19/042 |

FOREIGN PATENT DOCUMENTS

| | | |
|---|---|---|
| AT | 514945 | 5/2015 |
| CN | 102892331 A | 1/2013 |
| DE | 10 2017 107 109 | 10/2018 |
| DE | 10 2018 108 867 | 10/2019 |
| EP | 3 367 341 | 8/2018 |
| EP | 3 510 896 | 7/2019 |
| JP | 2007-301344 | 11/2007 |
| JP | 2008-129614 | 6/2008 |
| JP | 2019-506604 | 3/2019 |
| JP | 2021-521569 | 8/2021 |
| KR | 20100126456 A | 12/2010 |
| WO | 2012/061406 | 5/2012 |
| WO | 2017/124195 | 7/2017 |
| WO | 2017/177247 | 10/2017 |
| WO | 2019/197424 | 10/2019 |

OTHER PUBLICATIONS

Brochure "Lippe Series and Relax Bed Conversion" from Burmeier GmbH & Co., KG, Jan. 2019 (with partial translation).
Wikipedia article "Mobile radio standard" to demonstrate knowledge, Mar. 2025, URL: https://de.wikipedia.org/wiki/Mobilfunkstandard.

* cited by examiner

DEVICE FOR RECEIVING SIGNALS VIA AT LEAST ONE ELECTRICALLY DRIVEABLE OR ADJUSTABLE FURNITURE ELEMENT

BACKGROUND OF THE INVENTION

The invention relates to a device for receiving of signals by at least one electrically drivable or movable furniture element and a furniture arrangement with such a device. The invention also relates to a method for receiving signals by at least one electrically drivable or moveable furniture element and a corresponding computer program product.

The use of electrically drivable or movable furniture elements replaces the manual opening and closing of furniture parts, in particular flaps, doors or drawers. This makes a convenient and effort-saving operation of furniture parts possible.

According to the state of the art, the controlling of electrically drivable or movable furniture elements is often effected via a wireless connection. This dispenses with the costly laying of wires.

Published document AT 11 904 U1 discloses a physically actuatable switch, which sends wireless signals via an auxiliary transmitter to a receiver of the furniture element and thus prompts it to move a furniture part.

Although the switch can be positioned so as to be easier to actuate and at a location that is easier to reach than the furniture part itself, an operator must be at the location of the switch to move the furniture part.

Moreover, the switch must be physically actuated directly by the operator themselves, either directly by hand or indirectly by pressing on the furniture part in front of it.

SUMMARY OF THE INVENTION

The object of the present invention is to avoid these disadvantages. In particular, an improved device for controlling at least one electrically drivable or movable furniture element, an improved furniture arrangement with such a device, an improved method for controlling an electrically drivable or movable furniture element and an improved computer program product for performing such a method are to be created.

A device according to the invention for receiving signals by at least one electrically drivable or movable furniture element has at least one receiver for receiving at least one wirelessly transmitted signal. the at least one wirelessly transmitted first signal, which was received by the at least one receiver, can be further transmitted to at least one furniture element.

the at least one receiver is formed such that the at least one wirelessly transmitted signal is receivable and processable via a first transmission protocol and a second transmission protocol, wherein the first transmission protocol is different from the second transmission protocol.

By this, it is rendered possible to receive wirelessly transmitted signals from different sources with different transmitters. In particular, also from devices, which are different from the physically operable switch, for instance of mobile terminal devices or firmly installed, voice-controlled transmitters.

In order to meet modern standards, the at least one signal is a digital signal, wherein at least one transmission protocol is a digital transmission protocol.

Further, the at least one wirelessly transmitted signal can be transmitted by at least one transmitter. Thereby, the furniture element can for instance be controlled via the at least one transmitter.

In a preferred embodiment of the device the transmission with a first transmission protocol of the at least one signal is effected:
  unidirectionally between the at least one transmitter and the at least one receiver, and/or
  addressed directly to the at least one receiver, and/or
  without an acknowledgement of receipt by the at least one receiver, and/or
  without checking the readiness-to-receive of the at least one receiver, and/or
  with a firmly predefined or predefinable routing of the at least one signal, wherein ESB (Enhanced ShockBurst) is preferably used as first transmission protocol. Among other things, through the above-named properties, ESB makes the transmission of data with a short latency time possible. A short latency time is vital for a fluid operability by an operator.

Moreover, the at least one signal is transmitted via Bluetooth as a second transmission protocol. The advantage of Bluetooth consists in the standard support of typical devices. A large number of devices can thus be used, for example, for controlling the at least one furniture element.

The combined use of two transmission protocols (ESB and Bluetooth) makes possible the advantage of short latency times for transmitters provided at the factory, through the use of ESB, and at the same time high flexibility in the use of additional devices of any desired make, such as for example domestic appliances or mobile terminal devices, through the use of Bluetooth.

At least one transmission protocol, preferably all transmission protocols, are preferably bidirectional. Thereby, it is in particular possible to receive feedback of the furniture elements, in particular feedback of their current position.

It is beneficial when at least two separate transmitters are provided, each of which transmits at least one signal via different transmission protocols, since the diversity of control possibilities of the furniture elements is thus increased. As mentioned above, for example, it is thus possible to send from a mobile terminal device and from a firmly installed, voice-controlled and separate transmitter.

In a preferred embodiment of the device, at least one transmitter, which transmits the signal preferably to several receivers, is arranged in a firm spatial arrangement with respect to the at least one furniture element while in operation. This at least one transmitter preferably communicates via the first transmission protocol, and this at least one transmitter is preferably integrated in a wireless network, in particular a WLAN network.

This transmitter can therefore function as an interface ("bridge") between the wireless network and the furniture drives. The wireless network can also be in data connection with the internet via a router.

Further, this transmitter can translate signals of the second transmission protocol into signals of the first transmission protocol and vice versa. A furniture element can thus also be accessed via this transmitter by a mobile device.

In a further preferred embodiment of the device, at least one transmitter, which transmits the at least one signal preferably to several receivers, is formed as mobile terminal device, especially as mobile phone. This at least one transmitter preferably communicates via the second transmission protocol. Thus, the furniture element can be comfortably controlled or configured via a mobile phone.

Further, the at least one transmitter is in cabled and/or wireless data connection with a furniture element, wherein at least one wirelessly transmitted signal can be sent to the receiver of at least one further furniture element, and this communication is preferably effected via the first transmission protocol. Thus, information about the movement status of a furniture element can be transmitted to another furniture element. Thereby the collision of two furniture parts driven by the furniture elements can be avoided, for instance.

Moreover, a furniture element can forward a signal from another transmitter to a further furniture element.

In an embodiment of the device according to the invention, at least one transmitter instead has a switch that is physically operatable, in particular by hand, wherein this at least one transmitter preferably communicates via the first transmission protocol. An operator can thus control the furniture element via manual actuation of a switch.

Also, it is beneficial that at least one transmitter is arranged on at least one domestic appliance, preferably a robotic vacuum cleaner or a microwave oven, wherein this transmitter preferably communicates via the second transmission protocol. Thus, a domestic appliance can transmit, for instance, status data to at least one furniture element. A robotic vacuum cleaner can thereby open a furniture part autonomously, in order to drive into a tray of the furniture.

In an embodiment of the device, the at least one furniture element has an electrical drive device for moving a movable furniture part, in particular a drawer, a door or a flap. The furniture element is thus formed as a furniture drive and can open or close a furniture part.

Moreover, the at least one furniture element can have at least one electrical closing device for locking a movable furniture element, in particular a drawer, a door or a flap. The furniture element is thus formed as a furniture lock and can lock a furniture part. Unauthorized persons can thereby be barred from accessing certain compartments.

In an embodiment of the device, the at least one furniture element and the allocated receiver can be combined to form a structural unit, preferably accommodated in a common housing. The combination in a structural unit reduces the effort during installation on the piece of furniture, for example. The accommodation in a housing also makes an unobtrusive and/or aesthetic appearance of the structural unit possible.

In an embodiment, configuration data for the configuration of at least one furniture element can be transmitted to the at least one receiver via a transmission protocol as at least one signal, wherein the configuration data can preferably be saved on the furniture element. Thus, the furniture elements can be configured prior to the normal operation.

In an embodiment of the device, control signals for controlling the at least one furniture element can be transmitted to the at least one receiver via a transmission protocol as at least one signal, in particular for defining the movement status and/or the position of a furniture part driven by the furniture element. This is the case during the normal operation, in which the user uses the furniture.

In a further embodiment of the device, status data can be transmitted to the at least one receiver via at least one transmission protocol as at least one signal, wherein the status data describe the position and/or movement status of at least one furniture drive. In particular, this can be used for avoiding collisions and/or for synchronising two driven furniture parts, when two furniture drives share data among each other. Further, this can be used for an analysis of the furniture elements during the configuration.

In an embodiment of the device, the at least one transmitter is integrated in a preferably wireless network. Via the wireless network, a connection to the internet can be established and further network-compatible devices can be integrated.

In order to have a further, contactless control option available in addition to or in place of the control option through a physical intervention of the operator (for example via a push button), it is beneficial if a device for voice control is provided, which accesses at least one furniture element via the at least one transmitter.

In such an embodiment with voice control, the device for voice control can include a terminal device, connected to the internet, with a microphone, wherein:
  a voice recording effected by the terminal device can be sent to an external computer network, in particular over the internet,
  an electronic message determined by the voice recording and/or an operating command determined by the voice message can be sent from the external computer network to the at least one transmitter, in particular over a wireless network, and
  at least one signal determined by the operating command can be transmitted to at least one furniture element.

The external computer network is usually referred to as the cloud, and existing cloud services can be used, such as for example from Google or Amazon.

A furniture arrangement according to the invention includes at least one piece of furniture and at least one device according to the invention for controlling an electrically drivable or movable furniture element.

In an embodiment of the furniture arrangement according to the invention, the furniture arrangement comprises at least two pieces of furniture.

Furthermore, the furniture arrangement comprises, as driven furniture parts, at least one flap and/or at least one door and/or at least one drawer. In the case where the furniture arrangement comprises several pieces of furniture, the furniture parts can be distributed between the several pieces of furniture as desired.

In the case of such a furniture arrangement, a kitchen is preferably envisaged. The device for receiving signals can then make communication with the kitchen possible in many different ways. For example, the kitchen can be controlled via voice control, switch, and mobile terminal device, and can communicate with domestic appliances.

In a method according to the inventions for receiving signals by at least one electrically drivable or movable furniture element, in particular with the above-described device, at least one receiver for receiving at least one wirelessly transmitted signal is used.

It comprises the following method steps:
  receiving of at least one wirelessly transmitted first signal by the at least one receiver, and
  receiving of at least one wirelessly transmitted second signal by the at least one receiver At least one wirelessly transmitted first signal is transmitted via a first transmission protocol, and the at least one wirelessly transmitted second signal is transmitted via a second transmission protocol, which is different from the first transmission protocol.

In an embodiment of the method according to the invention, the at least one wirelessly transmitted signal is emitted by at least one transmitter.

In an embodiment of the method according to the invention, the transmission of the at least one signal via the first transmission protocol is effected:

unidirectionally between the at least one transmitter and the at least one receiver and/or addressed directly to the at least one receiver, and/or without an acknowledgement of receipt by the at least one receiver, and/or without checking the readiness-to-receive of the at least one receiver, and/or with a firmly predefined or predefinable routing of the at least one signal.

ESB (Enhanced ShockBurst) is preferably used as first transmission protocol. An advantage of this transmission protocol consists in particular in a data transmission with a short latency time.

In an embodiment of the method according to the invention, the at least one signal is transmitted via Bluetooth as second transmission protocol. An advantage of Bluetooth is the standard availability in many devices.

The computer program product according to the invention comprises commands, which, if executed by at least one arithmetic unit, prompt it to perform the method according to the invention from at least one memory unit, which is in a data connection with the at least one arithmetic unit or can be brought into such a connection.

With respect to the present application, by the expression "signal" is meant a physical signal. For example, within this meaning, two signals which transmit the same semantic content via the same transmission protocol but are sent one after the other are different from one another.

BRIEF DESCRIPTION OF THE DRAWINGS

Embodiments of the invention are discussed with reference to the figures, in which.

DETAILED DESCRIPTION OF THE INVENTION

FIG. 1a, FIG. 1b, FIG. 2, FIG. 3, FIG. 4a and FIG. 4b show various embodiments of pieces of furniture 9 with furniture drives 11, which are severally already the state of the art. Of course, the invention can also be used with novel, other furniture drives 11.

Figure 1A:
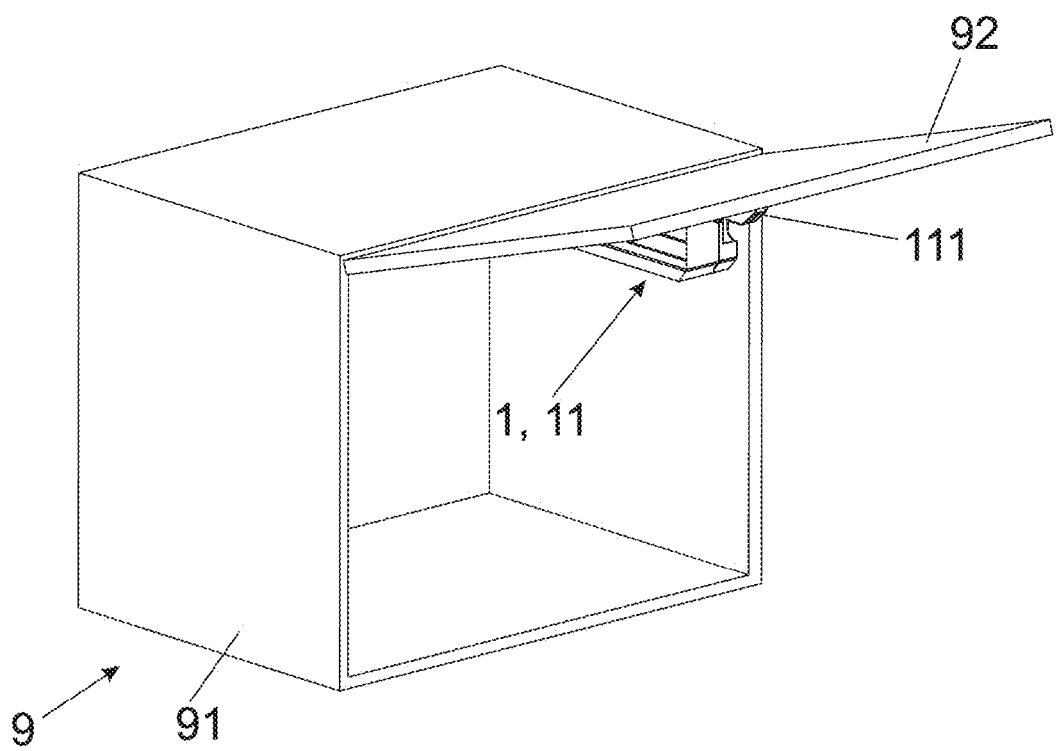
FIGS. 1a, b show a piece of furniture with a furniture drive for moving a flap
Figure 1B:
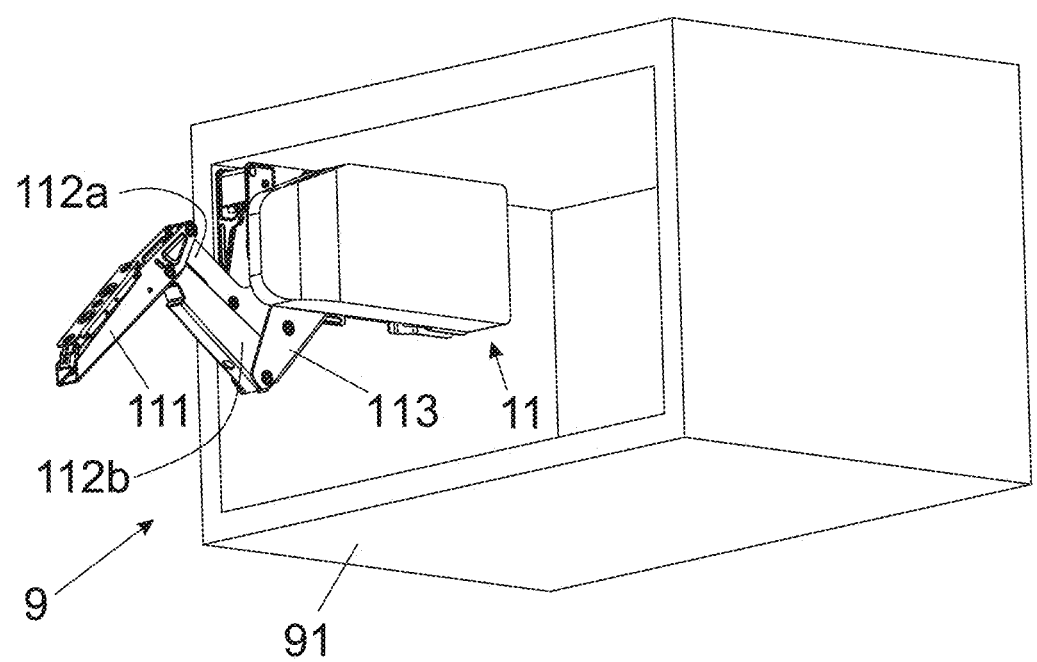

In FIGS. 1a and 1b, in each case a piece of furniture 9 with a furniture element 1 formed as a furniture drive 11 is shown. A flap 92 that can be opened upwards is also shown in FIG. 1a but is not represented in FIG. 1b for reasons of clarity. The flap 92 is connected to the furniture carcass 91 via a furniture element 1 formed as a furniture drive 11. The furniture element 1 comprises a control arm 111, two levers 112a, 112b and a drive lever 113. The control arm 111 is fastened to the flap 92 and rotatably connected to the levers 112a, 112b. A drive lever 113, which can be moved electrically by the furniture drive 11, is in turn rotatably connected to the levers 112a, 112b. This embodiment of the furniture drive 11 is also disclosed in published document WO 2017/177247 A1.

Figure 2:
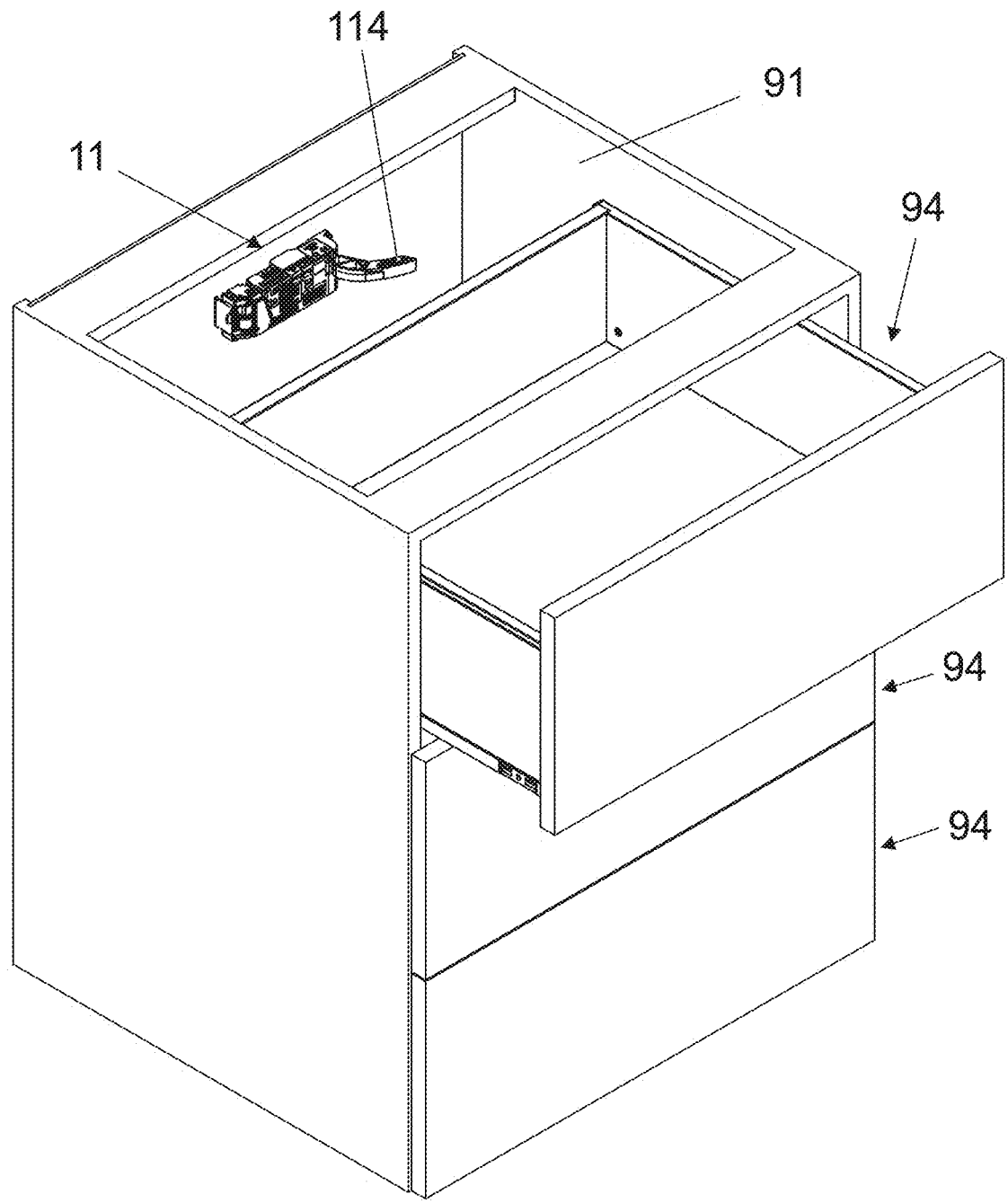
FIG. 2 shows a piece of furniture with a furniture drive for ejecting a drawer

FIG. 2 shows a piece of furniture 9, which has three drawers 94 in a furniture carcass 91. At least one drawer 94 can be ejected electrically by a furniture drive 11. For this, the furniture drive 11 has an ejection lever 114. This embodiment is also disclosed in published document AT 513756 A4.

Figure 3:
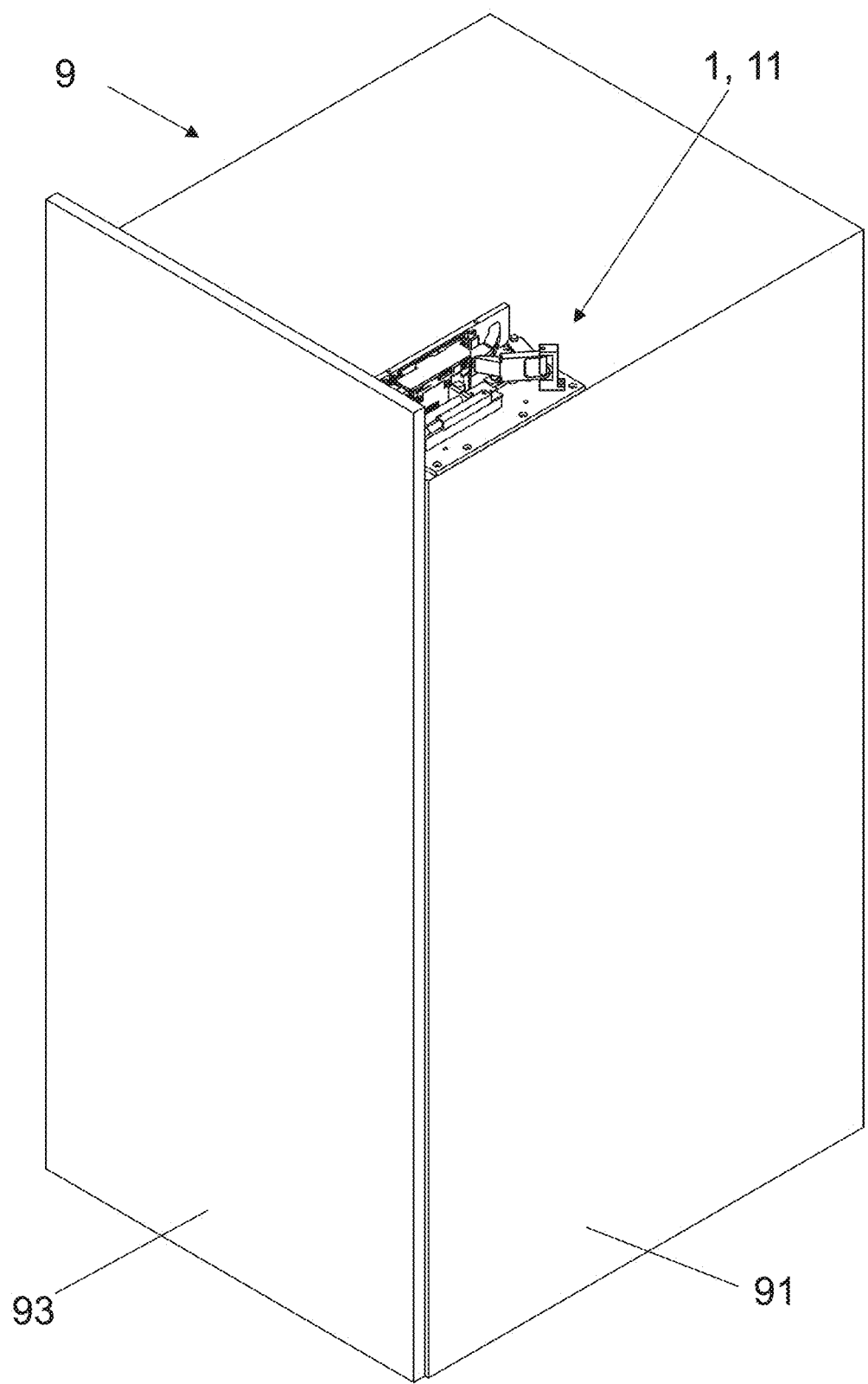
FIG. 3 shows a piece of furniture with a furniture drive for ejecting a door

FIG. 3 shows a piece of furniture 9 in the form of a cabinet. The door 93 arranged on the furniture carcass 91 can be ejected by an electrical furniture drive 11 as in FIG. 2. This embodiment is also disclosed in published document AT 514945 A4.

The electrical furniture drives 11 shown in FIGS. 1a to 3 can also be accessed via a radio communication.

Figure 4A:
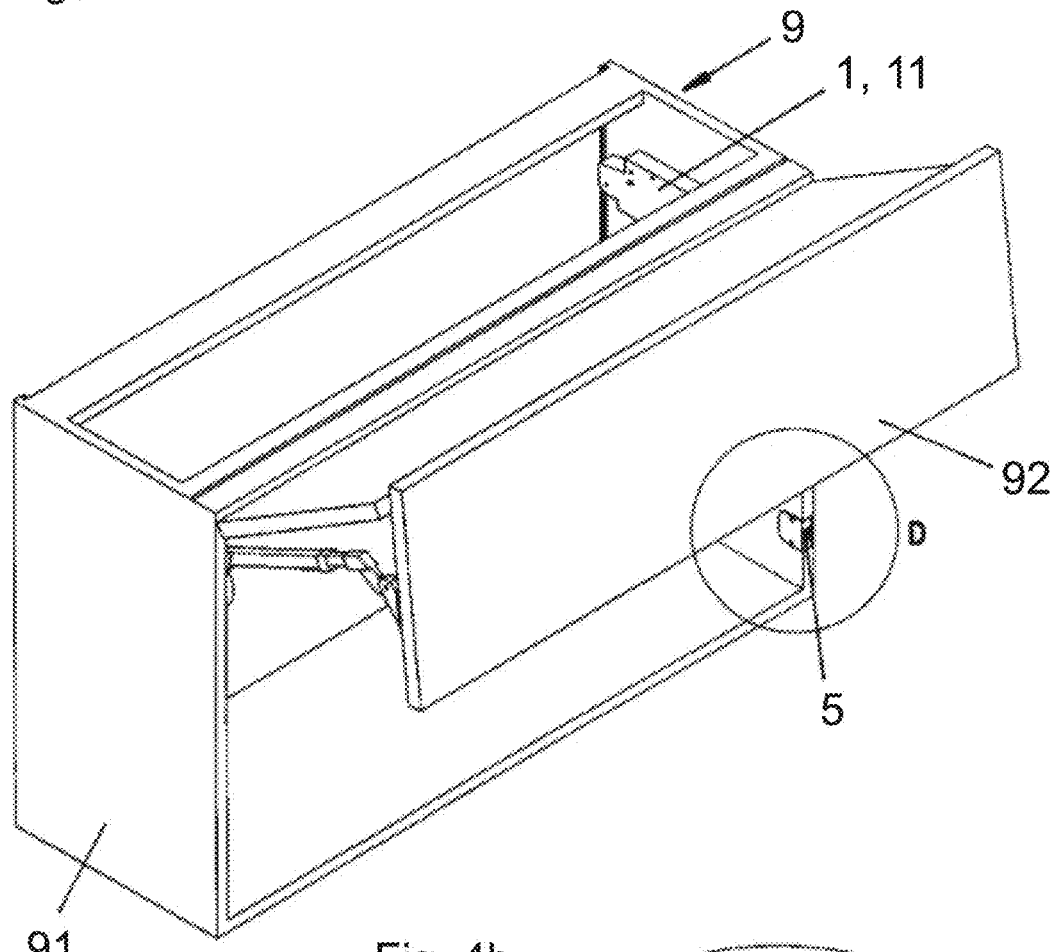
FIGS. 4a, b show a piece of furniture with a furniture drive for moving a flap and physically actuatable switch
Figure 4B:
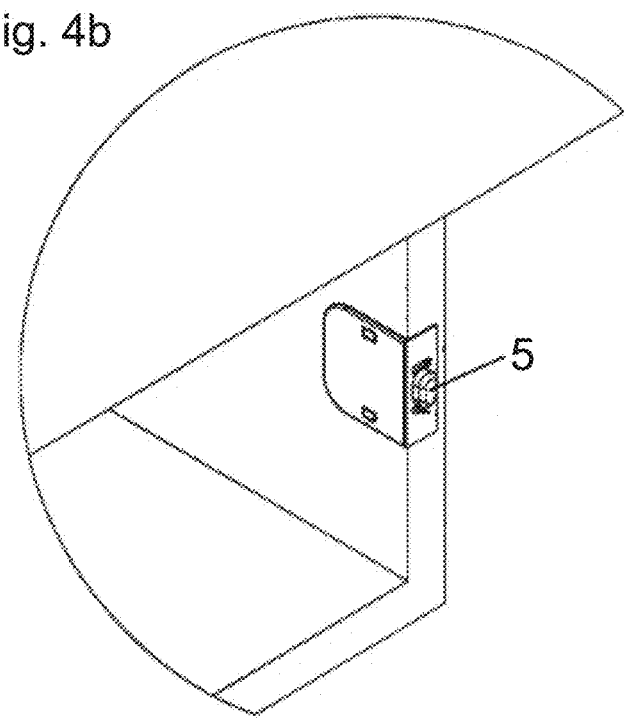

FIGS. 4a and 4b disclose an embodiment example of a physically actuatable switch 5, which transmits signals 4 to the furniture drive 11 via a radio communication. The signals 4 can prompt the furniture drive 11 to open or close the flap 92. Here, FIG. 4b shows a detailed view of the region D in FIG. 4a. This embodiment example is also disclosed in published document AT 11 904 U1.

In an embodiment example of the present application it is provided that several pieces of furniture 9 form a furniture arrangement.

The furniture arrangement can, for example, comprise a kitchen unit with several, in particular at least two, pieces of kitchen furniture. Through the communication with and between several furniture elements 1, in particular furniture drives 11 and furniture locks 12, the kitchen can be made easier to use. In particular, flaps 92, doors 93 and drawers 94 can electively be controlled by radio switch 5, voice control, mobile terminal device 34 or the like.

Figure 5:
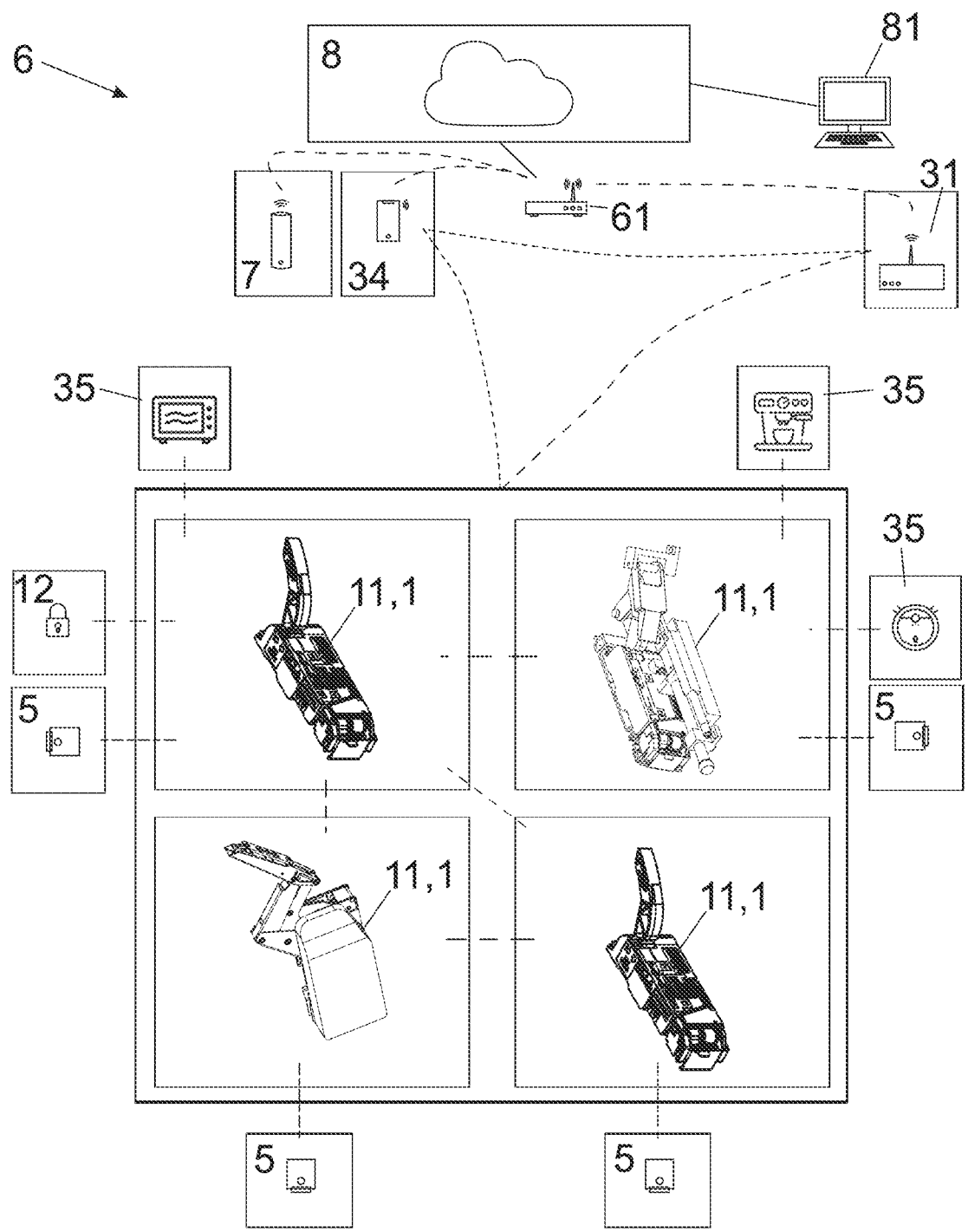
FIG. 5 shows a schematic overview of several furniture elements controlled via radio signals

FIG. 5 shows a schematic representation of the communication with and between several furniture elements 1 by means of a wireless communication network. The dashed lines show radio communications between the individual elements. The following are part of the wireless communication network:

four furniture drives 11 of different types, in particular of the type in FIG. 1, FIG. 2 and FIG. 3 physically actuatable switches 5 a furniture lock 12 domestic appliances 35 in the form of a microwave oven, a coffee machine and a robotic vacuum cleaner a main transmitter 31, which is integrated into a wireless network 6 a router 61, which is likewise integrated into a wireless network 6 and can produce a connection to the internet a mobile terminal device 34 and a device for voice control 7.

Over the internet, the communication network is in data connection with at least one external computer network 8 ("cloud"), in which the analysis of a voice message can be carried out, for example. At least one external computer network 8 can be accessed by means of a computer with web interface 81.

In this example, the furniture drives 11 can be accessed via a first as well as via a second transmission protocol according to the invention, as explained closer in the following.

FIGS. 6a-e show different embodiment examples of the device according to the invention for receiving signals 4 from at least one furniture element 1.

Figure 6A:
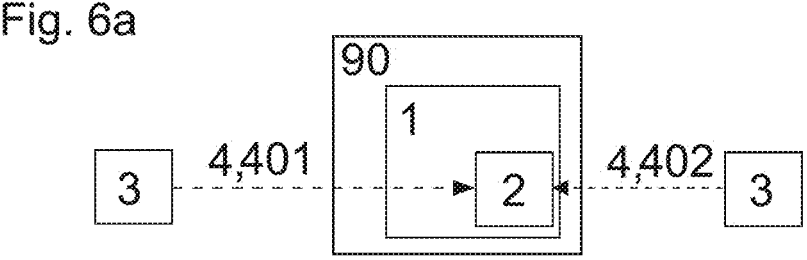
FIGS. 6a-e show embodiments of the device according to the invention for receiving signals from at least one furniture element

FIG. 6a shows a furniture element 1 with a receiver 2 allocated to the furniture element 1. The receiver 2 receives signals 401, 402, wherein one signal 4 is a signal 401 transmitted via a first transmission protocol and a further signal 4 is a signal 402 transmitted via a second transmission protocol. The signals 401, 402 can, for instance, be used for controlling or configuring the furniture element 1.

Figure 6B:
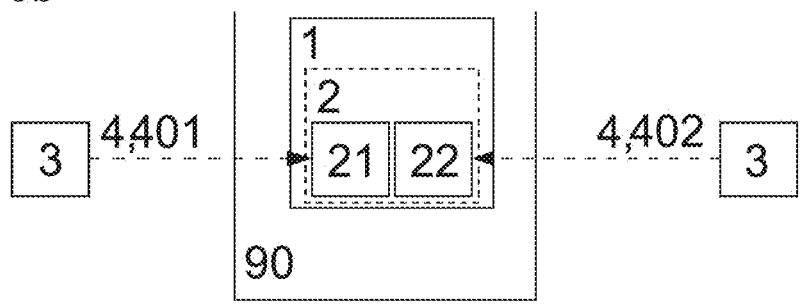

FIG. 6b shows a receiver 2 with two receiving units 21, 22, wherein a first receiving unit 21 receives signals 401 transmitted via a first transmission protocol and a second receiving unit 22 receives signals 402 transmitted via a second transmission protocol. This is especially the case, when both signals 401, 402 are transmitted on different carrier frequencies, such that two antennas are necessary for receiving the radio signals. But two receiving units 21, 22 can also share an antenna, wherein in this case typically signals 401, 402 are received via the first or the second transmission protocol alternately. The time scheduling for reception and sending time must, for instance, be executed by a program, which runs in the receiver 2 and in transmitters 3 which emit the signals 401, 402.

In an embodiment example ESB (Enhanced Shock Burst) is used as first transmission protocol and Bluetooth is used as second transmission protocol.

Figure 6C:
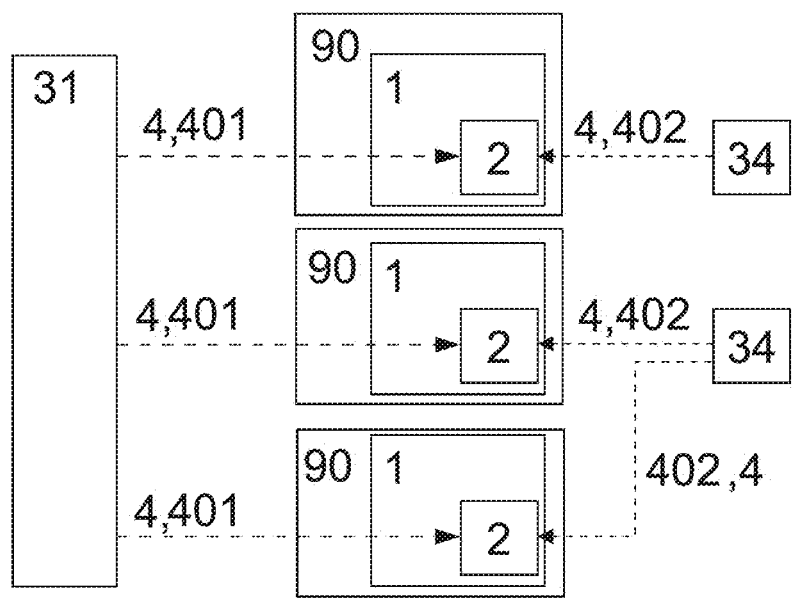

A typical embodiment example is shown in FIG. 6c. Here three furniture elements 1 with associated receivers 2 are accessed by a main transmitter 31 with signals 401, which are transmitted via the first transmission protocol (in particular ESB). Thereby, the main transmitter 31 can be a bridge, which itself receives operating commands 45 from a wireless network 6 via WLAN. The wireless network 6 can thereby be connected with the internet and an external computer network 8 ("cloud"). According to the invention, one of the receivers 2 additionally receives signals 402, which are transmitted via the second transmission protocol, for instance from a mobile terminal device 34. This second transmission protocol is, as mentioned, typically Bluetooth, which is supported by most mobile terminal devices 34, such as smartphones or tablets.

Thereby, the signals 401, 402 can function as control signals for controlling the furniture elements 1. A user can thus open or close a furniture part 90 driven by the furniture element 1 via a mobile terminal device 34 as well as via voice-control, for instance via a device for voice control 7 connected to the external computer network ("cloud").

The signals 401, 402 can also be used for configuring one or several furniture elements 1, which is typically conducted once prior to the use by a user.

Figure 6D:
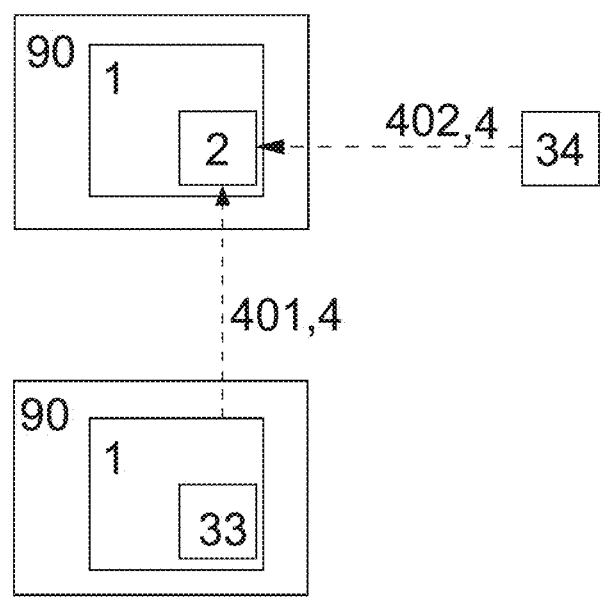

Moreover, the signals 401 can comprise status data, to convey the position or the movement status of a furniture element 1 to other furniture elements 1. This is shown in FIG. 6d, where a transmitter 33 of a furniture element 1 conveys its position to a neighbouring furniture element 1, for instance for avoiding a collision of the furniture parts 90 driven by the two shown furniture elements 1, or for synchronising the two furniture elements 1.

When the command for opening is sent to a first furniture element 1 by a mobile terminal device 34 via a signal 402 in the second transmission protocol, the status of a second furniture element 1 can be conveyed to the first furniture element 1 via a signal 401 in the first transmission protocol as well.

Figure 6E:
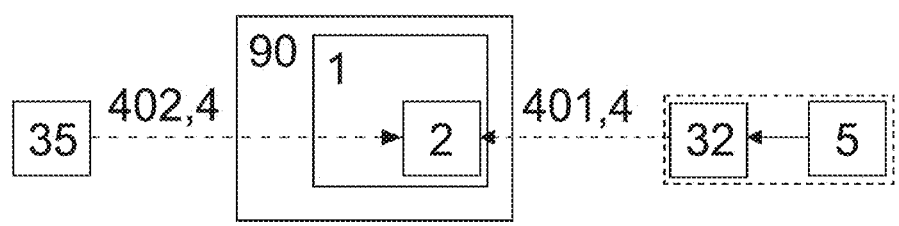

FIG. 6e shows the control of a furniture part 90 by a furniture element 1 with the receiver 2 with a physically actuatable switch 5 (via an auxiliary transmitter 32) and a domestic appliance 35. Thereby, the auxiliary transmitter 32 sends its signals 401 via the first transmission protocol (ESB), while the domestic appliance 35 sends its signals 402 via the second transmission protocol (typically, domestic appliances 35 suitable for radio transmission support Bluetooth).

For instance, a flap 92 arranged in a region of the piece furniture 9 close to the floor can thus serve as a "garage door" for a robotic vacuum cleaner, which can, by itself, open and close the flap 92 via Bluetooth for driving into and out of a tray in the piece of furniture 9 close to the floor ("garage").

A further example for a domestic appliance 35 communicating via Bluetooth is a microwave oven in a tray with a flap 92 of a piece of furniture 9, which can retrieve the status of the flap 92 via Bluetooth for security reasons, and which, for instance, only heats when the flap 92 is open.

Further, the flap 92 can be opened and closed with a switch 5 via ESB.

LIST OF REFERENCE NUMBERS 1 furniture element
  11 furniture drive
    111 control arm
    112a lever
    112b lever
    113 lever
    114 ejection lever
  12 furniture lock
2 receiver
  21 first receiving unit
  22 second receiving unit
3 transmitter
  31 main transmitter
  32 auxiliary transmitter
  33 transmitter of a furniture element
  34 mobile terminal device
  35 domestic appliance
4 signal
  401 signal in the first transmission protocol
  402 signal in the second transmission protocol
  41 control signal
  42 signal with configuration data
  43 signal with status data
  44 voice recording
  45 operating command
  46 electronic message
5 switch
6 wireless network
  61 router
7 device for voice control
8 external computer network
  81 computer with web interface
9 piece of furniture
  90 furniture part
  91 furniture carcass
  92 flap
  93 door
  94 drawer

The invention claimed is:

1. A device for receiving signals by at least one electrically drivable or movable furniture element, the device comprising:
at least one receiver for receiving at least two wirelessly transmitted signals, wherein the at least two wirelessly transmitted signals, which were received by a single receiver of the at least one receiver, are further transmittable to at least one furniture element, wherein the single receiver is formed such that the at least two wirelessly transmitted signals are receivable and processable at least via a first transmission protocol and a second transmission protocol, wherein the first transmission protocol is different from the second transmission protocol, and wherein a first wirelessly transmitted signal of the at least two wirelessly transmitted signals is transmitted to the single receiver via the first transmission protocol and a second wirelessly transmittal signal of the at least two wirelessly transmitted signals is transmitted to the single receiver via the second transmission protocol.

2. The device according to claim 1, wherein at least one signal is a digital signal, wherein at least one transmission protocol is a digital transmission protocol.

3. The device according to claim 1, wherein at least one wirelessly transmitted signal can be transmitted from at least one transmitter.

4. The device according to claim 3, wherein the transmission with the first transmission protocol of the at least one signal is effected:
unidirectionally between at least one transmitter and the at least one receiver and/or
addressed directly to the at least one receiver, and/or
without an acknowledgement of receipt by the at least one receiver, and/or
without checking the readiness-to-receive of the at least one receiver, and/or
with a firmly predefined or predefinable routing of the at least one signal, wherein ESB (Enhanced ShockBurst) is preferably used as first transmission protocol.

5. The device according to claim 1, wherein at least one signal is transmitted via Bluetooth as second transmission protocol.

6. The device according to claim 1, wherein at least one transmission protocol, preferably all transmission protocols, are bidirectional.

7. The device according to claim 3, wherein at least two separate transmitters are provided, each of which emits at least one signal via different transmission protocols.

8. The device according to claim 3, wherein at least one transmitter, which transmits the at least one signal preferably to several receivers, is arranged in a firm spatial arrangement with respect to the at least one furniture element while in operation, wherein this at least one transmitter preferably communicates via the first transmission protocol, and wherein this at least one transmitter is preferably integrated in a wireless network, in particular a WLAN network.

9. The device according to claim 8, wherein at least one transmitter, which transmits the at least one signal preferably to several receivers, is formed as a mobile terminal device, preferably as mobile phone, wherein this at least one transmitter preferably communicates via the second transmission protocol.

10. The device according to claim 3, wherein the at least one transmitter is in cabled and/or wireless data connection with a furniture element, wherein at least one wirelessly transmitted signal is transmittable to the receiver of at least one further furniture element, wherein this communication is preferably effected via the first transmission protocol.

11. The device according to claim 3, wherein at least one transmitter has a switch that is physically operatable, in particular by hand, wherein this at least one transmitter preferably communicates via the first transmission protocol.

12. The device according to claim 3, wherein at least one transmitter is arranged on at least one domestic appliance, preferably a robotic vacuum cleaner or a microwave oven, wherein this transmitter preferably communicates via the second transmission protocol.

13. The device according to claim 1, wherein the at least one furniture element has an electrical drive device for moving a movable furniture part, in particular a drawer, a door or a flap.

14. The device according to claim 1, wherein the at least one furniture element has at least one electrical closing device for locking a movable furniture element, in particular a drawer (94), a door or a flap.

15. The device according to claim 1, wherein the at least one furniture element and the allocated receiver are combined to form a structural unit, preferably accommodated in a common housing.

16. The device according to claim 1, wherein configuration data for the configuration of at least one furniture element are transmittable to the at least one receiver via at least one transmission protocol as at least one signal, wherein the configuration data can preferably be saved on the furniture element.

17. The device according to claim 1, wherein control signals for controlling the at least one furniture element are transmittable to the at least one receiver via a transmission protocol as at least one signal, in particular for defining the movement status and/or the position of a furniture part driven by the furniture element.

18. The device according to claim 1, wherein status data can be transmitted to the at least one receiver via at least one transmission protocol as at least one signal, wherein the status data describe the position and/or movement status of at least one furniture element, in particular for avoiding collisions and/or for synchronising two driven furniture parts.

19. The device according to claim 3, wherein the at least one transmitter is integrated in a preferably wireless network.

20. The device according to claim 3, wherein a device for voice control is provided with which device for voice control accesses at least one furniture element via the at least one transmitter.

21. The device according to claim 20, wherein the device for voice control comprises a terminal device, connected to the internet, with a microphone, wherein
a voice recording effected by the terminal device can be sent to an external computer network, in particular over the internet,
an electronic message determined by the voice recording and/or an operating command determined by the voice recording can be sent from the external computer network to the at least one transmitter, in particular over a wireless network, and
at least one signal determined by the operating command can be transmitted to at least one furniture element.

22. A furniture arrangement comprising at least one piece of furniture and at least one device for controlling the electrically drivable or movable furniture element of claim 1.

23. The furniture arrangement according to claim 22, wherein the furniture arrangement comprises at least two pieces of furniture.

24. The furniture arrangement according to claim 22, wherein the furniture arrangement comprises, as driven furniture parts, at least one flap and/or at least one door and/or at least one drawer, wherein in the case where the furniture arrangement comprises several pieces of furniture, the furniture parts can be distributed between the several pieces of furniture as desired.

25. A method for receiving signals by at least one electrically drivable or movable furniture element, in particular with the device according to claim 1, with at least one receiver for receiving at least one wirelessly transmitted signal, the method comprising:

receiving of at least one wirelessly transmitted first signal by the at least one receiver, receiving of at least one wirelessly transmitted second signal by the at least one receiver, wherein the at least one wirelessly transmitted first signal is transmitted via a first transmission protocol, and wherein the at least one wirelessly transmitted second signal is transmitted via a second transmission protocol, which is different from the first transmission protocol.

26. The method according to claim 25, wherein the at least one wirelessly transmitted signal is emitted by at least one transmitter.

27. The method according to claim 25, wherein the transmission of the at least one first signal via the first transmission protocol is effected:

unidirectionally between the at least one transmitter and the at least one receiver, and/or addressed directly to the at least one receiver, and/or without an acknowledgement of receipt by the at least one receiver and/or without checking the readiness-to-receive of the at least one receiver, and/or with a firmly predefined or predefinable routing of the at least one first signal, wherein ESB (Enhanced ShockBurst) is preferably used as first transmission protocol.

28. The method according to claim 25, wherein the at least one second signal is transmitted via Bluetooth as second transmission protocol.

29. A non-transitory computer program product comprising commands, which, if executed by at least one arithmetic unit, prompt it to perform the method according to claim 25 from at least one memory unit, which is in a data connection with the at least one arithmetic unit or can be brought into such a connection.

* * * * *